US008443168B2

United States Patent
Zeng

(10) Patent No.: US 8,443,168 B2
(45) Date of Patent: May 14, 2013

(54) MICROCONTROLLER COMPRISING A PLURALITY OF REGISTERS AND INSTRUCTION MODES

(75) Inventor: Xiaojun Zeng, Shanghai (CN)

(73) Assignee: O2Micro Inc., Santa Clara, CA (US)

( * ) Notice: Subject to any disclaimer, the term of this patent is extended or adjusted under 35 U.S.C. 154(b) by 762 days.

(21) Appl. No.: 12/228,995

(22) Filed: Aug. 18, 2008

(65) Prior Publication Data

US 2009/0070544 A1    Mar. 12, 2009

Related U.S. Application Data

(60) Provisional application No. 60/965,289, filed on Aug. 17, 2007.

(51) Int. Cl.
*G06F 9/312* (2006.01)
*G06F 12/06* (2006.01)
*G06F 9/318* (2006.01)

(52) U.S. Cl.
USPC .......... 711/215; 711/202; 711/E12.078; 712/205; 712/229; 712/E9.033; 712/E9.035

(58) Field of Classification Search .......... 711/202, 711/E12.078, 215; 712/205, 229, E9.033, 712/E9.035
See application file for complete search history.

(56) References Cited

U.S. PATENT DOCUMENTS

| 5,854,939 | A | 12/1998 | Wollan et al. | |
| 7,162,612 | B2 | 1/2007 | Henry et al. | |
| 2004/0243786 | A1* | 12/2004 | Roche et al. | 711/213 |
| 2006/0212685 | A1* | 9/2006 | Raghavan et al. | 712/225 |
| 2008/0313425 | A1* | 12/2008 | Le et al. | 712/23 |

FOREIGN PATENT DOCUMENTS

| CN | 1236455 A | 11/1999 |
| TW | I284281 B | 7/2007 |

* cited by examiner

*Primary Examiner* — Mardochee Chery

(57) ABSTRACT

A microcontroller includes a plurality of primary registers, a secondary register and a central processing unit (CPU). The primary registers store a plurality of primary data respectively. Each primary data has a first width. The secondary register includes the plurality of primary registers and stores a secondary data having a second width. The secondary data includes a combination of the plurality of primary data. The CPU executes a first instruction in a first mode in which a primary data is fetched for operation and executes a second instruction in a second mode in which the secondary data is fetched for operation.

17 Claims, 33 Drawing Sheets

| Mnemonic | 16-bit Machine Code | Description/Operation | S0 | S1 | S2 | S3 |
|---|---|---|---|---|---|---|
| RJMP n | 1011 nnnn nnnn nnnn | Relative jump to PC + n | V | V | V | V |
| IJMP | 0000 0000 0000 0011 | Indirect jump based on index register IY | V | V | V | V |
| RCALL n | 1100 nnnn nnnn nnnn | Relative call subroutine | V | V | V | V |
| ICALL | 0000 0000 0000 1100 | Indirect call based on index register IY | | V | V | V |
| CALLTBL n | 1111 1111  nnnn nnnn | Call subroutine based on address table | | V | V | V |
| JMPTBL n | 1111 1110  nnnn nnnn | Jump based on address table | | V | V | V |
| RET | 0000 0000  0000 1111 | Return from subroutine | V | | | V |
| RETD k | 0111 1110  kkkk kkkk | Return from subroutine with immediate | V | | | V |
| RETI | 0000 0000  0011 0000 | Return from interrupt | V | | | V |

| ADDRESS | CONTENTS |
|---|---|
| 0000H | R0L=A |
| 0001H | R0H |
| 0002H | R1L |
| 0003H | R1H |
| 0004H | IXL |
| 0005H | IXH |
| 0006H | IYL |
| 0007H | IYH |
| 0008H | PCL |
| 0009H | PCH |
| 000AH | SPL |
| 000BH | SPH |
| 000CH | CC |
| 000DH – 00DFH | SPECIAL FUNCTION AND I/O REGISTERS |
| 00E0H – FFFFH | SRAM |

| Mnemonic | 16-bit Machine Code | Description/Operation | S0 | S1 | S2 | S3 |
|---|---|---|---|---|---|---|
| ADDI A, k | 0001 0000 kkkk kkkk | A ← A + k, add immediate to A | ✓ | ✓ | ✓ | ✓ |
| ADDR Ra, Rb | 1001 1010 00aa abbb | Ra ← Ra + Rb for byte | | ✓ | ✓ | ✓ |
| ADDM A, @f, d | 0010 000d ffff ffff | add with direct addressing mode | ✓ | ✓ | ✓ | ✓ |
| ADDX A, @offs5[rx], d | 0000 0001 0dro oooo | add using index address with offset | | | ✓ | ✓ |
| ADDXP A, @offs3[rx], d, q | 0000 1011 00dq rooo | add using index address with offset-post-increment(OPI) or offset-pre-decrement(OPD) | | | ✓ | |
| ADDWR Ri, Rj | 1001 1111 0000 iijj | Ri ← Ri + Rj for word | | ✓ | | ✓ |

FIG. 5

| Mnemonic | 16-bit Machine Code | Description/Operation | S0 | S1 | S2 | S3 |
|---|---|---|---|---|---|---|
| ADCI A, k | 0001 0001 kkkk kkkk | A ← A + k + C | V | V | V | V |
| ADCR Ra, Rb | 1001 1010 01aa abbb | Ra ← Ra + Rb + C for byte | | V | V | V |
| ADCM A, @f, d | 0010 001d ffff ffff | add with carry using direct addressing mode | V | V | V | V |
| ADCX A, @offs5[rx], d | 0000 0001 1dro oooo | add with carry using index address with offset | | | V | V |
| ADCXP A, @offs3[rx], d, q | 0000 1011 01dq rooo | add with carry using index address with OPI or OPD | | | V | V |
| ADCWR Ri, Rj | 1001 1111 0001 iijj | Ri ← Ri + Rj + C for word | | V | | V |

FIG. 6

| Mnemonic | 16-bit Machine Code | Description/Operation | S0 | S1 | S2 | S3 |
|---|---|---|---|---|---|---|
| SUBI A, k | 0001 0010  kkkk kkkk | A ← A − k (subtract immediate from A) | ✓ | ✓ | ✓ | ✓ |
| SUBR Ra, Rb | 1001 1010 10aa abbb | Ra ← Ra − Rb for byte subtract | | ✓ | ✓ | ✓ |
| SUBM @f, A, d | 0010 010d ffff ffff | subtract A from @f using direct addressing mode | ✓ | ✓ | ✓ | ✓ |
| SUBX @offs5[rx], A, d | 0000 0010 0dro oooo | subtract A from data memory using index address with offset | | | ✓ | ✓ |
| SUBXP @offs3[rx], A, d, q | 0000 1011 10dq rooo | subtract A from data memory using index address with OPI or OPD | | | ✓ | ✓ |
| SUBWR Ri, Rj | 1001 1111 0010 iijj | Ri ← Ri − Rj for word subtract | | ✓ | | ✓ |

FIG. 7

| Mnemonic | 16-bit Machine Code | Description/Operation | S0 | S1 | S2 | S3 |
|---|---|---|---|---|---|---|
| SBCR Ra, Rb | 1001 1010 11aa abbb | Ra ← Ra − Rb − C for byte subtract with borrow | | V | V | V |
| SBCM A, @f, d | 0010 011d ffff ffff | subtract data memory from A with borrow using direct addressing mode | V | V | V | V |
| SBCX A, @offs5[rx], d | 0000 0010 1dro oooo | subtract data memory from A with borrow using index address with offset | | | V | V |
| SBCXP A, @offs3[rx], d, q | 0000 1011 11dq rooo | subtract data memory from A with borrow using index address with OPI or OPD | | | V | V |

FIG. 8

| Mnemonic | 16-bit Machine Code | Description/Operation | S0 | S1 | S2 | S3 |
|---|---|---|---|---|---|---|
| SBCWR Ri, Rj | 1001 1111  0011 iijj | Ri ← Ri – Rj – C for word subtract with borrow |  | V |  | V |
| INCR Ra, Rb | 1001 1011  00aa abbb | Ra ← Rb + 1 for byte |  | V | V | V |
| INCM A, @f, d | 0010 100d  ffff ffff | increment using direct addressing mode | V | V | V | V |
| INCX A, @offs5[rx], d | 0000 0011  0dro oooo | increment using index address with offset |  |  | V | V |
| INCXP A, @offs3[rx], d, q | 0000 1100  00dq rooo | increment using index address with OPI or OPD |  | V |  | V |

FIG. 9

| Mnemonic | 16-bit Machine Code | Description/Operation | S0 | S1 | S2 | S3 |
|---|---|---|---|---|---|---|
| INCWR Ri, Rj | 1001 1111  0100 iijj | Ri ← Rj + 1 for word increment | | V | | V |
| DECR Ra, Rb | 1001 1011  01aa abbb | Ra ← Rb − 1 for byte decrement | | V | V | V |
| DECM A, @f, d | 0010 101d  ffff ffff | decrement using direct addressing mode | V | V | V | V |
| DECX A, @offs5[rx], d | 0000 0011  1dro oooo | decrement using index address with offset | | | V | V |
| DECXP A, @offs3[rx], d, q | 0000 1100  01dq rooo | decrement using index address with OPI or OPD | | | V | V |
| DECWR Ri, Rj | 1001 1111  0101 iijj | Ri ← Rj − 1 for word decrement | | V | | V |

FIG. 10

| Mnemonic | 16-bit Machine Code | Description/Operation | S0 | S1 | S2 | S3 |
|---|---|---|---|---|---|---|
| CMPI A, k | 0001 0011 kkkk kkkk | compare A with immediate (A – k) | V | V | V | V |
| CMPXP A, @offs3[rx], q | 0000 1111 01-q rooo | compare A with a data from data memory using index address with OPI or OPD | | | V | V |
| CMPWR Ri, Rj | 1001 1111 0110 iijj | compare Ri with Rj (Ri – Rj) for word | | V | | V |
| MULI A, k | 0001 0100 kkkk kkkk | multiply A by immediate | | V | V | V |
| MULR Ra, Rb | 1001 1011 11aa abbb | multiply Ra by Rb | | V | V | V |
| MULM A, @f | 0111 1001 ffff ffff | multiply A by data from data memory using direct addressing mode | | V | V | V |

FIG. 11

| Mnemonic | 16-bit Machine Code | Description/Operation | S0 | S1 | S2 | S3 |
|---|---|---|---|---|---|---|
| ANDI A, k | 0001 0101 kkkk kkkk | logical AND: A ← A AND k | V | V | V | V |
| ANDR Ra, Rb | 1001 1100 00aa abbb | Ra ← Ra AND Rb for byte | V | V | V | V |
| ANDM A, @f, d | 0010 110d ffff ffff | AND A with a data from data memory using direct addressing mode | V | V | V | |
| ANDX A, @offs5[rx], d | 0000 0100 0dro oooo | using index address with offset | | | V | V |
| ANDXP A, @offs3[rx], d, q | 0000 1100 10dq rooo | using index address with OPI or OPD | | V | V | V |
| ANDWR Ri, Rj | 1001 1111 0111 iijj | Ri ← Ri AND Rj for word | | V | | V |

FIG. 12

| Mnemonic | 16-bit Machine Code | Description/Operation | S0 | S1 | S2 | S3 |
|---|---|---|---|---|---|---|
| ORI A, k | 0001 0110  kkkk kkkk | logical OR: A ← A OR k | ✓ | ✓ |  | ✓ |
| ORR Ra, Rb | 1001 1100  01aa abbb | Ra ← Ra OR Rb for byte |  | ✓ | ✓ | ✓ |
| ORM A, @f, d | 0010 111d  ffff ffff | using direct addressing mode | ✓ | ✓ | ✓ | ✓ |
| ORX A, @offs5[rx], d | 0000 0100  1dro oooo | using index address with offset |  |  | ✓ | ✓ |
| ORXP A, @offs3[rx], d, q | 0000 1100  11dq rooo | using index address with OPI or OPD |  |  | ✓ | ✓ |
| ORWR Ri, Rj | 1001 1111  1000 iijj | Ri ← Ri OR Rj for word |  | ✓ |  | ✓ |
| XORI A, k | 0001 0111  kkkk kkkk | logical exclusive OR: A ← A XOR k | ✓ | ✓ | ✓ | ✓ |

FIG. 13

| Mnemonic | 16-bit Machine Code | Description/Operation | S0 | S1 | S2 | S3 |
|---|---|---|---|---|---|---|
| XORR Ra, Rb | 1001 1100  10aa abbb | Ra ← Ra XOR Rb for byte | | V | V | V |
| XORM A, @f, d | 0011 000d  ffff ffff | using direct addressing mode | V | V | V | V |
| XORX A, @offs5[rx], d | 0000 0101  0dro oooo | using index address with offset | | | V | V |
| XORXP A, @offs3[rx], d, q | 0000 1101  00dq rooo | using index address with OPI or OPD | | V | | V |
| XORWR Ri, Rj | 1001 1111  1001 iijj | Ri ← Ri XOR Rj for word | V | | V | |
| RLCR Ra, Rb | 1001 1100  11aa abbb | rotate left through carry for working byte-registers | | V | V | V |

FIG. 14

| Mnemonic | 16-bit Machine Code | Description/Operation | S0 | S1 | S2 | S3 |
|---|---|---|---|---|---|---|
| RLCM A, @f, d | 0011 001d ffff ffff | rotate left with carry through data memory using direct addressing mode | V | V | V | V |
| RLCX A, @offs5[rx], d | 0000 0101 1dro oooo | rotate left through carry for data memory using index address with offset | | | V | V |
| RLCXP A, @offs3[rx], d, q | 0000 1101 01dq rooo | rotate left through carry for data memory using index address with OPI or OPD | | | V | V |
| RLCWR Ri, Rj | 1001 1111 1010 iijj | rotate left through carry for working word-register | | V | V | V |

FIG. 15

| Mnemonic | 16-bit Machine Code | Description/Operation | S0 | S1 | S2 | S3 |
|---|---|---|---|---|---|---|
| RRCR Ra, Rb | 1001 1101  00aa abbb | rotate right through carry for working byte-register |  | V | V | V |
| RRCM A, @f, d | 0011 010d  ffff ffff | rotate right through carry for data memory in direct addressing mode | V | V | V | V |
| RRCX A, @offs5[rx], d | 0000 0110  0dro oooo | rotate right through carry for data memory in index address with offset |  |  | V | V |
| RRCXP A, @offs3[rx], d, q | 0000 1101  10dq rooo | rotate right through carry for data memory using index address with OPI or OPD |  |  | V | V |

FIG. 16

| Mnemonic | 16-bit Machine Code | Description/Operation | S0 | S1 | S2 | S3 |
|---|---|---|---|---|---|---|
| RRCWR Ri, Rj | 1001 1111  1011 i i j j | rotate right though carry for working word-registers | | v | | v |
| RLNCR Ra, Rb | 1001 1101  01aa abbb | rotate left without carry for working byte-register | | v | v | v |
| RLNCM A, @f, d | 0011 011d  ffff ffff | rotate left without carry for data memory in direct addressing mode | v | v | v | v |
| RLNCX A, @offs5[rx], d | 0000 0110  1dro oooo | rotate left without carry for data memory using index address with offset | | | v | v |

FIG. 17

| Mnemonic | 16-bit Machine Code | Description/Operation | S0 | S1 | S2 | S3 |
|---|---|---|---|---|---|---|
| RLNCXP A, @offs3[rx], d, q | 0000 1101  11dq rooo | rotate left without carry for data memory using index address with OPI or OPD | | | V | V |
| RLNCWR Ri, Rj | 1001 1111  1100 i i j j | rotate left without carry for word-registers | | V | | V |
| RRNCR Ra, Rb | 1001 1101  10aa abbb | rotate right without carry for working byte-register | | V | V | V |
| RRNCM A, @f, d | 0011 100d  ffff ffff | rotate right without carry for data memory using direct addressing mode | V | V | V | V |

FIG. 18

| Mnemonic | 16-bit Machine Code | Description/Operation | S0 | S1 | S2 | S3 |
|---|---|---|---|---|---|---|
| RRNCX A, @offs5[rx], d | 0000 0111  0dro oooo | rotate right without carry for data memory using index address with offset | | | V | V |
| RRNCXP A, @offs3[rx], d, q | 0000 1110  00dq rooo | rotate right without carry for data memory using index address with OPI or OPD | | | V | V |
| RRNCWR Ri, Rj | 1001 1111  1101 iijj | rotate right without carry for word-registers | | V | | V |
| SWAPR Ra, Rb | 1001 1101  11aa abbb | nibble swap for working byte-register | | V | V | V |
| SWAPM A, @f, d | 0011 101d  ffff ffff | nibble swap for data memory using direct addressing mode | V | V | V | V |

FIG. 19

| Mnemonic | 16-bit Machine Code | Description/Operation | S0 | S1 | S2 | S3 |
|---|---|---|---|---|---|---|
| SWAPX A, @offs5[rx], d | 0000 0111  1dro oooo | nibble swap for data memory using index address with offset | | | V | V |
| SWAPXP A, @offs3[rx], d, q | 0000 1110  01dq rooo | nibble swap for data memory using index address with OPI or OPD | | | V | V |
| SWAPWR Ri, Rj | 1001 1110  1101 iijj | Byte swap in word-registers | | V | | V |
| NOTR Ra, Rb | 1001 1110  00aa abbb | one's complement for byte-registers | | V | V | V |
| NOTM A, @f, d | 0011 110d  ffff ffff | one's complement for data memory using direct addressing mode | V | | V | V |
| NOTX A, @offs5[rx], d | 0000 1000  0dro oooo | one's complement for data memory using index address with offset | | V | | V |

FIG. 20

| Mnemonic | 16-bit Machine Code | Description/Operation | S0 | S1 | S2 | S3 |
|---|---|---|---|---|---|---|
| NOTXP A, @offs3[rx], d, q | 0000 1110  10dq rooo | one's complement for data memory using index address with OPI or OPD |  | v | v | v |
| NOTWR Ri, Rj | 1001 1111  1110 i i j j | one's complement for word-register | v |  |  | v |
| NEGR Ra, Rb | 1001 1110  01aa abbb | two's complement for byte-registers | v | v | v | v |
| NEGM A, @f, d | 0011 111d  ffff ffff | two's complement for data memory using direct addressing mode | v | v | v | v |
| NEGX A, @offs5[rx], d | 0000 1000  1dro oooo | two's complement for data memory using index address with offset |  | v |  | v |
| NEGXP A, @offs3[rx], d, q | 0000 1110  11dq rooo | two's complement for data memory using index address with OPI or OPD |  | v |  | v |

FIG. 21

| Mnemonic | 16-bit Machine Code | Description/Operation | S0 | S1 | S2 | S3 |
|---|---|---|---|---|---|---|
| NEGWR Ri, Rj | 1001 1111 1111 i i j j | two's complement for word-register | | | | |
| CLRM @f | 0111 1010 ffff ffff | clear a data from data memory using direct addressing mode | | V | | V |
| CLRXP @offs3[rx], q | 0000 1111 000q rooo | clear a data from data memory using index address with OPI or OPD | | | V | V |
| SETM @f | 0111 1011 ffff ffff | set a data from data memory using direct addressing mode | | | V | V |
| SETXP @offs3[rx], q | 0000 1111 001q rooo | set a data from data memory using index address with OPI or OPD | | | V | V |

FIG. 22

| Mnemonic | 16-bit Machine Code | Description/Operation | S0 | S1 | S2 | S3 |
|---|---|---|---|---|---|---|
| MOVI Ra, k | 0001 1aaa kkkk kkkk | move k to a working byte-register | V | V | V | V |
| MOVR Ra, Rb | 1001 1110 10aa abbb | move between byte-registers | | V | V | V |
| MOVM Ra, @f, d | 0100 daaa ffff ffff | move between byte-registers and data memory | V | V | V | V |
| MOVX Ra, @offs5[rx], d | 1000 00da aar o oooo | move between working byte-registers and data memory using index address with offset | | | V | V |
| MOVXP Ra, @offs3[rx], d, q | 1000 110d qaaa rooo | move between byte-registers and data memory using index address with OPI or OPD | | | V | V |

FIG. 23

| Mnemonic | 16-bit Machine Code | Description/Operation | S0 | S1 | S2 | S3 |
|---|---|---|---|---|---|---|
| LPX Ra, @offs5[IY], p | 1000 111p  aaao oooo | load a byte from program memory to a working byte-register using IY with offset | | | V | V |
| LPXP Ra, @offs3[IY], p, q | 1001 0110  pqaa aooo | load a byte from program memory to a working byte-register using IY with OPI or OPD | | | V | V |
| LPDX @offs3[IX], @offs3[IY], p | 0000 1001  0pxx xyyy | load a byte from program memory to a data memory using index address with offset | | | | V |
| MOVWR Ri, Rj | 1001 1110  1100 i i j j | move between working word-registers | | V | | V |

FIG. 24

| Mnemonic | 16-bit Machine Code | Description/Operation | S 0 | S S 1 | S S 2 | S S 3 |
|---|---|---|---|---|---|---|
| LPDXP @offs3[X], @offs3[Y], p, q | 1001 0111 pqxx xyyy | load a byte from program memory to a data memory using index address with OPI or OPD | | | | V |
| LPWX Ri, @offs5[Y] | 0000 1001  1dro oooo | load a word from program memory to a working word-register using IY with offset | | V | | V |
| LPWXP Ri, @offs3[Y], q | 0000 1111  10qi iooo | load a word from program memory to a working word-register using IY with OPI or OPD | | V | | V |

FIG. 25

| Mnemonic | 16-bit Machine Code | Description/Operation | S0 | S1 | S2 | S3 |
|---|---|---|---|---|---|---|
| PUSHR Ra | 0111 1101  0000 0aaa | push working byte-registers into stack | v | v | v | v |
| PUSHCC | 0111 1101  0101 1010 | push conditional code into stack | v | v | v | v |
| PUSHWR Ri | 0111 1101  1100 00i i | push working word-register into stack |  | v |  | v |
| POPR Ra | 0111 1101  0001 1aaa | restore byte-registers from stack | v | v | v | v |
| POPCC | 0111 1101  1010 0101 | restore conditional code from stack | v | v | v | v |
| POPWR Ri | 0111 1101  0011 11i i | restore word-register from stack |  | v |  | v |

FIG. 26

| Mnemonic | 16-bit Machine Code | Description/Operation | S0 | S1 | S2 | S3 |
|---|---|---|---|---|---|---|
| BCSR Ra, c, e | 1001 1001 0cee eaaa | bit clear or set for byte register | v | v | v | v |
| BCSM @f, c, e | 0101 ceee ffff ffff | bit clear or set for data memory using direct addressing mode | v | v | v | v |
| BCSX @offs5[rx], c, e | 1000 01ce eero oooo | bit clear or set for data memory using index address with offset | | | v | v |
| BCSXP @offs3[rx], c, e, q | 1001 000c eeeq rooo | bit clear or set for data memory using index address with OPI or OPD | | | v | v |

FIG. 27

| Mnemonic | 16-bit Machine Code | Description/Operation | S0 | S1 | S2 | S3 |
|---|---|---|---|---|---|---|
| BCSCC c, e | 1001 1110  1110 ceee | bit clear or set for conditional code | v | v | v | v |
| BTGR Ra, e | 0111 1100  00ee eaaa | bit toggle for byte-register | v | v | v | v |
| BTGM @f, e | 0111 0eee  ffff ffff | bit toggle for data memory using direct addressing mode | v | v | v | v |
| BTGX @offs5[rx], e | 1001 010e  eero oooo | bit toggle for data memory using index address with offset | | | v | v |
| BTGXP @offs3[rx], e, q | 1001 1000  eeeq rooo | bit toggle for data memory using index address with automatic OPI or OPD | | | v | v |

FIG. 28

| Mnemonic | 16-bit Machine Code | Description/Operation | s0 | s1 | s2 | s3 |
|---|---|---|---|---|---|---|
| SKPR Ra, c, e | 1001 1001 1cee eaaa | skip if the bit e is equal to c in register Ra | v | v |  | v |
| SKPM @f, c, e | 0110 ceee ffff ffff | skip if bit e is equal to c in a data from data memory in direct addressing mode | v | v | v | v |
| SKPX @offs5[rx], c, e | 1000 10ce eero oooo | skip if bit e is equal to c in a data from memory using index address with offset |  |  | v | v |
| SKPXP @offs3[rx], c, e, q | 1001 001c eeeq rooo | skip if the bit e is equal to c in a data from data memory using index address with automatic OPI or OPD |  |  | v | v |
| SKPCC c, e | 1001 1110 1111 ceee | skip if bit e is equal to c in CCR | v | v |  | v |
| BRACC n, c, e | 1010 ceee nnnn nnnn | Branch to PC+n if bit e is equal to c in CCR | v | v | v | v |

FIG. 29

| Mnemonic | 16-bit Machine Code | Description/Operation | S0 | S1 | S2 | S3 |
|---|---|---|---|---|---|---|
| RJMP n | 1011 nnnn nnnn nnnn | Relative jump to PC + n | √ | √ | √ | √ |
| IJMP | 0000 0000 0000 0011 | Indirect jump based on index register IY | √ | √ | √ | √ |
| RCALL n | 1100 nnnn nnnn nnnn | Relative call subroutine | √ | √ | √ | √ |
| ICALL | 0000 0000 0000 1100 | Indirect call based on index register IY | | √ | √ | √ |
| CALLTBL n | 1111 1111 nnnn nnnn | Call subroutine based on address table | | √ | √ | √ |
| JMPTBL n | 1111 1110 nnnn nnnn | Jump based on address table | | √ | √ | √ |
| RET | 0000 0000 0000 1111 | Return from subroutine | √ | | | √ |
| RETD k | 0111 1110 kkkk kkkk | Return from subroutine with immediate | √ | | | √ |
| RETI | 0000 0000 0011 0000 | Return from interrupt | √ | | | √ |

FIG. 30

| Mnemonic | 16-bit Machine Code | Description/Operation | S0 | S1 | S2 | S3 |
|---|---|---|---|---|---|---|
| NOP | 0000 0000 0000 0000 | No operation | V | V | V | V |
| SLEEP | 0000 0000 0011 1100 | Sleep for low power consuption | V | V | V | V |
| WDTCLR | 0000 0000 0011 0011 | Clear watchdog timer | V | V | V | V |
| TRAP | 0000 0000 1111 1111 | For debug | V | V | V | V |

FIG. 31

MICROCONTROLLER COMPRISING A PLURALITY OF REGISTERS AND INSTRUCTION MODES

RELATED APPLICATION

This application claims priority to U.S. Provisional Application No. 60/965,289, titled Microcontroller with Instruction Set, filed on Aug. 17, 2007, which is hereby incorporated by reference in its entirety.

TECHNICAL FIELD

The present invention relates to an electronic system, and more particularly to a microcontroller.

BACKGROUND

Microcontroller units (MCU) are widely used in electrical industries in recent years. The MCU includes instructions for manipulating behaviors of the MCU. Reduced Instruction Set Computing (RISC) microprocessors can be utilized.

Data memory of the microcontroller can be accessed in a direct addressing mode or an indirect addressing mode. In the direct addressing mode, the instruction includes an address for accessing the data memory directly. In the indirect addressing mode, the address for accessing the data memory is not contained in the instruction directly. Rather, the microcontroller may calculate an address according to an offset value in the instruction and content in a register. Therefore, the indirect addressing may be more complex than the direct addressing. However, the addressing space of the direct addressing in the conventional microcontroller may be limited. For example, a conventional instruction may have an encoding of 16-bit including an 8-bit opcode and an 8-bit operand. The 8-bit operand may include an 8-bit address. Thus, the direct addressing space of the data memory can be 0~255. Other space of the data memory may be accessed by indirect addressing.

Additionally, the conventional microcontroller may employ a set of 8-bit working registers or a set of 16-bit working registers for arithmetic and/or logic operations. However, operations with 16-bit data may not be applied to the 8-bit working registers directly, and operations with 8-bit data may not be applied to the 16-bit working registers directly. The conventional microcontroller may require extra instructions to perform operations for translating 16-bit data to 8-bit data if 8-bit working registers are employed or transferring 8-bit data to 16-bit data if 16-bit working registers are employed.

SUMMARY

In one embodiment, a microcontroller includes a plurality of primary registers, a secondary register and a central processing unit (CPU). The primary registers store a plurality of primary data respectively. Each primary data has a first width. The secondary register includes the plurality of primary registers and stores a secondary data having a second width. The secondary data includes a combination of the plurality of primary data. The CPU executes a first instruction in a first mode in which a primary data is fetched for operation and executes a second instruction in a second mode in which the secondary data is fetched for operation.

BRIEF DESCRIPTION OF THE DRAWINGS

Advantages of the present invention will be apparent from the following detailed description of exemplary embodiments thereof, which description should be considered in conjunction with the accompanying drawings, in which:

FIG. 2 is a diagram of an exemplary data memory in FIG. 1, in accordance with one embodiment of the present invention.

FIG. 5 is a partial listing of exemplary arithmetic operation instructions, in accordance with one embodiment of the invention.

FIG. 6 is a partial listing of exemplary arithmetic operation instructions, in accordance with one embodiment of the invention.

FIG. 7 is a partial listing of exemplary arithmetic operation instructions, in accordance with one embodiment of the invention.

FIG. 8 is a partial listing of exemplary arithmetic operation instructions, in accordance with one embodiment of the invention.

FIG. 9 is a partial listing of exemplary arithmetic operation instructions, in accordance with one embodiment of the invention.

FIG. 10 is a partial listing of exemplary arithmetic operation instructions, in accordance with one embodiment of the invention.

FIG. 11 is a partial listing of exemplary arithmetic operation instructions, in accordance with one embodiment of the invention.

FIG. 12 is a partial listing of exemplary logic operation instructions, in accordance with one embodiment of the invention.

FIG. 13 is a partial listing of exemplary logic operation instructions, in accordance with one embodiment of the invention.

FIG. 14 is a partial listing of exemplary logic operation instructions, in accordance with one embodiment of the invention.

FIG. 15 is a partial listing of exemplary logic operation instructions, in accordance with one embodiment of the invention.

FIG. 16 is a partial listing of exemplary logic operation instructions, in accordance with one embodiment of the invention.

FIG. 17 is a partial listing of exemplary logic operation instructions, in accordance with one embodiment of the invention.

FIG. 18 is a partial listing of exemplary logic operation instructions, in accordance with one embodiment of the invention.

FIG. 19 is a partial listing of exemplary logic operation instructions, in accordance with one embodiment of the invention.

FIG. 20 is a partial listing of exemplary logic operation instructions, in accordance with one embodiment of the invention.

FIG. 21 is a partial listing of exemplary logic operation instructions, in accordance with one embodiment of the invention.

FIG. 22 is a partial listing of exemplary logic operation instructions, in accordance with one embodiment of the invention.

FIG. 23 is a partial listing of exemplary data transfer instructions, in accordance with one embodiment of the invention.

FIG. 24 is a partial listing of exemplary data transfer instructions, in accordance with one embodiment of the invention.

FIG. 25 is a partial listing of exemplary data transfer instructions, in accordance with one embodiment of the invention.

FIG. 26 is a partial listing of exemplary data transfer instructions, in accordance with one embodiment of the invention.

FIG. 27 illustrates exemplary bit and bit test instructions, in accordance with one embodiment of the invention.

FIG. 28 illustrates exemplary bit and bit test instructions, in accordance with one embodiment of the invention.

FIG. 29 is a partial listing of exemplary program branching instructions, in accordance with one embodiment of the invention.

FIG. 30 is a partial listing of exemplary program branching instructions, in accordance with one embodiment of the invention.

FIG. 31 illustrates exemplary control instructions, in accordance with one embodiment of the invention.

DETAILED DESCRIPTION

Figure 1:
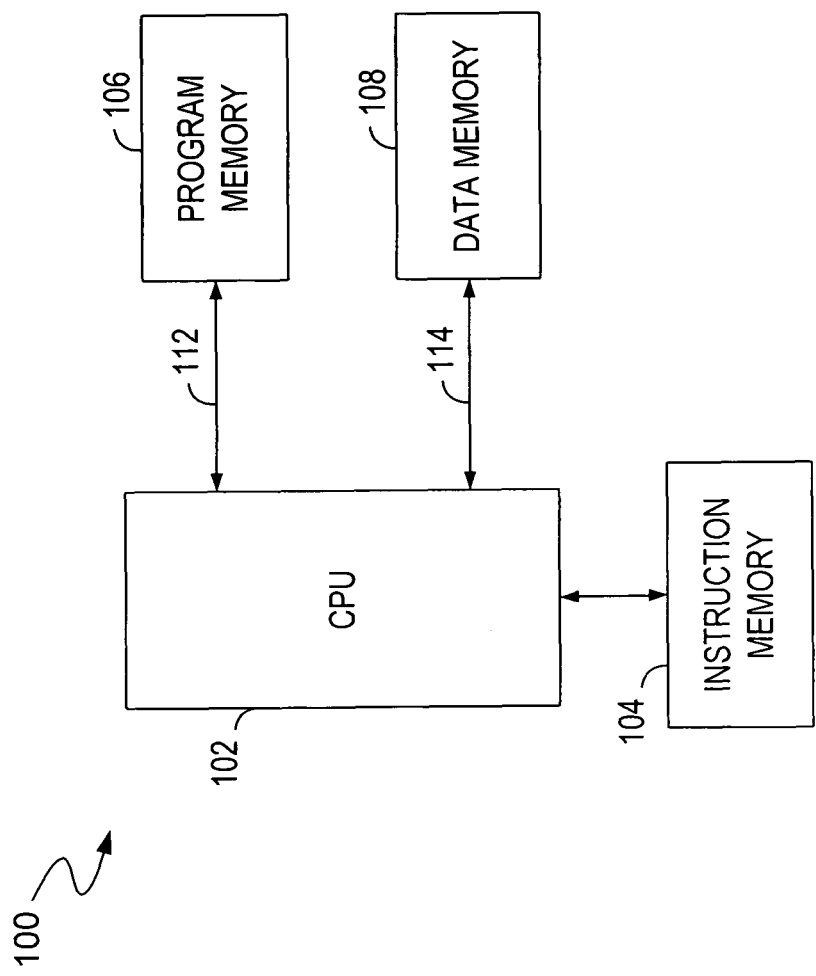
FIG. 1 is a block diagram of a microcontroller, in accordance with one embodiment of the present invention.

A microcontroller is disclosed herein in the present disclosure. Since the embodiments shown in the drawings are for illustrative purposes, some sub-components and/or peripheral components generally incorporated in the disclosure are omitted herein for purposes of brevity and clarity. In describing embodiments in accordance with the present invention, specific terminologies are employed for sake of clarity. However, the disclosure of this specification is not intended to be limited to selected terminologies and specified embodiments. It is understood by those skilled in the art that each specific element includes all technical equivalents that operate in a similar manner.

In one embodiment, the present invention provides a microcontroller. The microcontroller can be used in electronic devices, such as telecommunication devices, automobiles, security systems, battery systems, hot water heaters, thermostats, etc., for manipulating operations of the electronic devices.

FIG. 1 illustrates a block diagram of a microcontroller 100, in accordance with one embodiment of the present invention. The microcontroller 100 includes a central processing unit (CPU) 102, an instruction memory 104, a program memory 106, and a data memory 108, in one embodiment. The instruction memory 104 can be used to store an instruction set including a plurality of instructions and can be integrated in a decoder 110 (not shown in FIG. 1), in one embodiment. The decoder 110 can retrieve information from an instruction to in order to execute the instruction. The microcontroller 100 can employ a Harvard architecture in which the program memory 106 and the data memory 108 are separated. The program memory 106 can be a program flash memory for storing programs written by users. The data memory 108 can include a data static random access memory (SRAM) to store data for the programs. The microcontroller 100 includes a program memory bus 112 and a data memory bus 114 to access the program memory 106 and the data memory 108, respectively. The CPU 102 can fetch data from the data memory 108 via the data memory bus 114 when a current instruction is executed, and can fetch a next instruction from the program memory 106 via the program memory bus 112 simultaneously.

FIG. 2 illustrates an exemplary diagram of the data memory 108 of the microcontroller 100 in FIG. 1, in accordance with one embodiment of the present invention. The data memory 108 can include, but is not limited to, internal registers, special function registers, input/output (I/O) registers, and a static random access memory (SRAM). The data memory 108 can be configured differently in different applications. In one embodiment, internal registers are accessed when the microcontroller 100 executes operation instructions, such as arithmetic operation instructions, logic operation instructions, etc., special function registers are used to control peripheral hardware, I/O registers are used for I/O operations, and the SRAM is used for storing operating data.

In the example of FIG. 2, internal registers are mapped at address 0000H~000CH in the data memory 108, e.g., a register R0L at an address 0000H, a register R0H at an address 0001H, a register R1L at an address 0002H, a register R1H at an address 0003H, a register IXL at an address 0004H, a register IXH at an address 0005H, a register IYL at an address 0006H, a register IYH at an address 0007H, a register PCL at an address 0008H, a register PCH at an address 0009H, a register SPL at an address 000AH, a register SPH at an address 000BH, and a register CC at an address 000CH. In one embodiment, the register R0L is also used as a general accumulator (A) in arithmetic and logic operations. The special function registers, such as interface registers, control registers for ADC, timer, etc., and I/O registers are mapped at addresses 000DH~00DFH in the data memory 108. The SRAM can be an internal general data SRAM mapped at addresses 00E0H~FFFFH. The size of the SRAM is subject to change according to specific applications.

Figure 3:
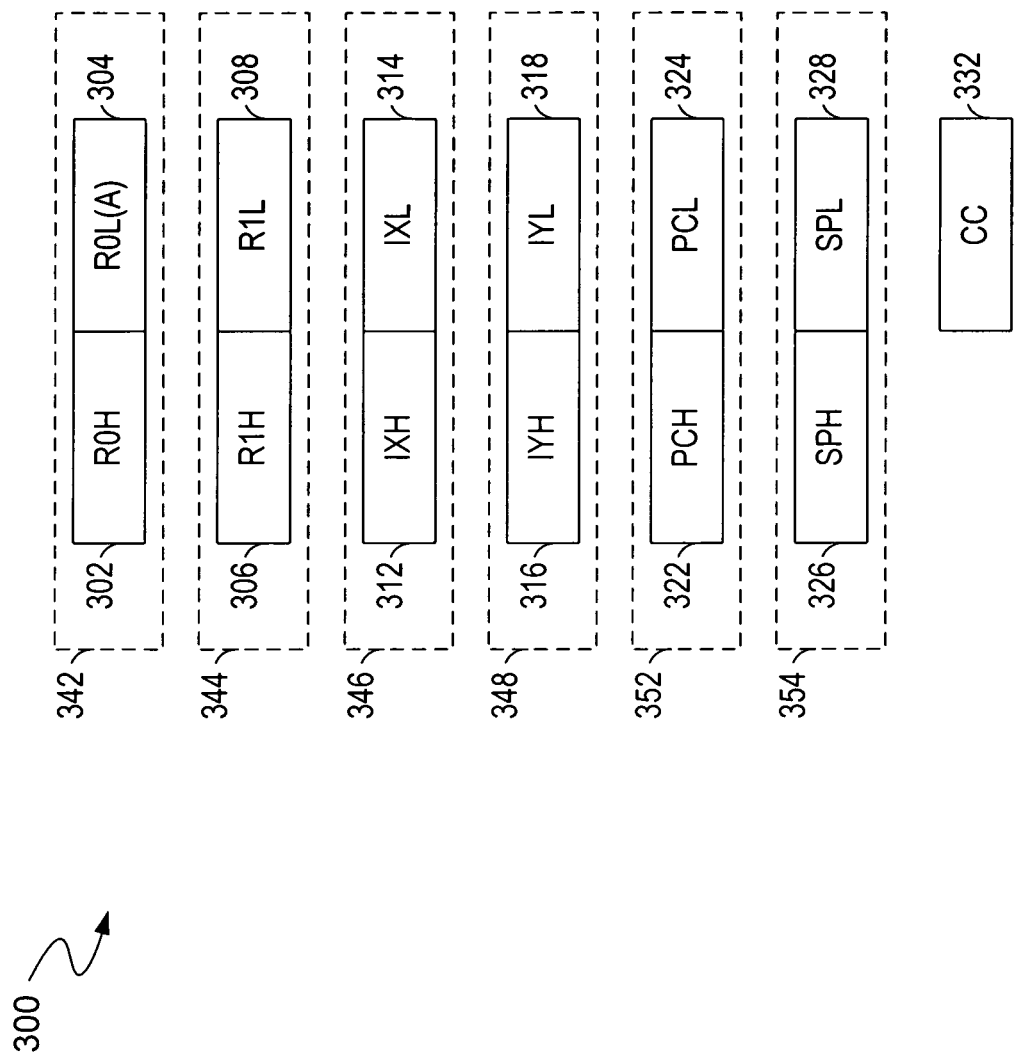
FIG. 3 is a diagram of an exemplary programming model, in accordance with one embodiment of the present invention.

FIG. 3 illustrates an exemplary programming model 300 of the registers from the data memory 108 in the microcontroller 100, in accordance with one embodiment of the present invention. The programming model 300 shows internal registers 302~332 (e.g., the internal registers in the data memory 108 in FIG. 2). More specifically, the programming model 300 illustrates working registers 302~318 (e.g., R0H 302, R0L 304, R1H 306, R1L 308, IXH 312, IXL 314, IYH 316 and IYL 318) which can store data for operations such as arithmetic and logic operations. The programming model 300 further shows program counter (PC) registers (e.g., PCH 322 and PCL 324) that can indicate which instruction in an instruction sequence is currently executed by the microcontroller, stack pointer (SP) registers (e.g., SPH 326 and SPL 328) that can point to a topmost data item in a stack of the microcontroller, and a condition code (CC) register 332 that can store current values of condition codes.

In one embodiment, the internal registers (e.g., the registers 302~332) are primary registers. Advantageously, a plurality of the primary registers 302~332 can constitute a secondary register. In one embodiment, the primary registers 302~332 constitute a group of secondary registers 342~354. More specifically, the register R0H 302 and the register R0L 304 constitute a register R0 342, the register R1H 306 and the register R1L 308 constitute a register R1 344, the register IXH 312 and the register IXL 314 constitute a register IX 346, the register IYH 316 and the register IYL 318 constitute a register IY 348, the register PCH 322 and the register PCL 324 constitute a register PC 352, and the register SPH 326 and the register SPL 328 constitute a register SP 354.

The primary registers 302~332 can store a plurality of primary data respectively. Each primary data has a first width, e.g., 8-bit. Each secondary register 342~354 includes a number of primary registers (e.g., two primary register as shown in the example of FIG. 3) and stores a secondary data having a second width, e.g., 16-bit. The secondary data includes a combination of the plurality of primary data. For example, the secondary data in the secondary register 342 includes a combination of the primary data in the primary register 302 and the primary data in the primary register 304. Advantageously, the CPU 102 can execute an instruction in a first mode in which a primary data is fetched for operation and can execute an instruction in a second mode in which the secondary data is fetched for operation. The instruction can designate one or more primary registers or one or more secondary registers according to information contained in the instruction.

In one embodiment, a width of a secondary register is equal to a summation of widths of the primary registers that constitute the associated secondary register. In one embodiment, the working registers 302~318 are of 8-bit width and can be used as working byte-registers. As such, the secondary registers 342~348 are of 16-bit width and can be used as working word-registers. Therefore, byte-operation instructions, such as ADDR Ra, Rb, can be executed by directly fetching data from the byte-registers (e.g., the primary registers). And word-operation instructions, such as ADDWR Ri, Rj, can be executed by directly fetching data from the word-registers (e.g., the secondary registers).

In one embodiment, an instruction can include addresses of registers, e.g., A, Ra, Rb, Ri and Rj. Ra and Rb can represent addresses of source working byte-registers, denoted as 'xxx' in encoding (machine code). The primary registers 302~318 can be selected and accessed according to the values of Ra and Rb in byte operations. Ri and Rj can represent addresses of source working word-registers, denoted as 'xx' in encoding (machine code). The secondary registers 342~348 can be selected and accessed according to the values of Ri and Rj in word operations.

For example, an instruction can be translated to a 16-bit machine code of aaaa aaaa aabb ccee by a translator (e.g., assembler or C-compiler), in one embodiment. Note that the machine code described in the present disclosure contains binary digits, and characters/symbols (e.g., aaaa aaaa aabb ccee) shown in the machine code are for illustrative purposes. In one embodiment, bit[15]~bit[6] (aaaa aaaa aa) portion indicates an operation of the instruction, bit[5]~bit[3] (bbc) portion indicates an address of a first primary register, and bit[2]~bit[0] (cee) portion indicates an address of a second primary register. Thus, the first primary register (bbc) and the second primary register (cee) are accessed when the instruction is executed. In another example, bit[15]~bit[4] (aaaa aaaa aabb) portion indicates an operation of the instruction, bit[3]~bit[2] (cc) portion indicates an address of a first secondary register, and bit[1]~bit[0] (ee) portion indicates an address of a second secondary register. In this situation, the first secondary register (cc) and the second secondary register (ee) are accessed when the instruction is executed.

For an exemplary instruction "ADDR Ra, Rb", the operation is an addition of data from the primary registers Ra and Rb that both contain 8-bit data. The instruction has a machine code of "1001 1010 00aa abbb", in which "1001 1010 00" indicates the byte-addition operation, "aaa" represents an address of the primary register Ra and "bbb" represents an address of the primary register Rb. Thus, the data in Ra is added to the data in Rb, and an addition result is written into the register Ra according to a destination bit (e.g., bit[6]). For an exemplary instruction "ADDWR Ri, Rj", the operation is an addition of data from the secondary registers Ri and Rj that both contain 16-bit data. The instruction has a machine code of "1001 1111 0000 iijj", in which "1001 1111 0000" indicates the word-addition operation, "ii" represents an address of the secondary register Ri, and "jj" represents an address of the secondary register Rj. The data in Ri is added to the data in Rj, and an addition result is written into the register Ri according to the destination bit (e.g., bit[4]).

Therefore, the microcontroller can execute instructions that include data of different lengths, and can store data in registers with corresponding widths. An executed result can be written into the primary registers or the secondary registers accordingly. In one embodiment, no extra transfer instructions and operations are required, e.g., translating 16-bit data to 8-bit data, or vice versa, etc. Thus, the total number of instructions and operating time can be decreased.

The internal working registers 302~318 can also be configured to have other widths, e.g., 16-bit or 32-bit, according to different application requirements, in one embodiment. Accordingly, the secondary registers 342~348 can be configured as 32-bit or 64-bit.

Similarly, the widths of the register PC 352 and SP 354 are also scalable and can be configured according to specific requirements in various applications. In one embodiment, the registers PC 352 and SP 354 can be 16-bit wide, including 8-bit registers PCH 322 and PCL 324, SPH 326 and SPL 328 respectively, for supporting a program with 64K instructions.

Additionally, the register CC 332 can be 8-bit wide. The register. CC 332 includes a carry/borrow flag (BC) bit, a zero flag (ZE) bit, a negative flag (NZ) bit, an overflow flag (OV) bit, a signed test (ST) bit, a half carry/borrow flag (HC) bit for nibble operations, a word carry/borrow flag (WC) bit for word operations, and a global interrupt enable/disable (IE) bit, in one embodiment.

Figure 4:
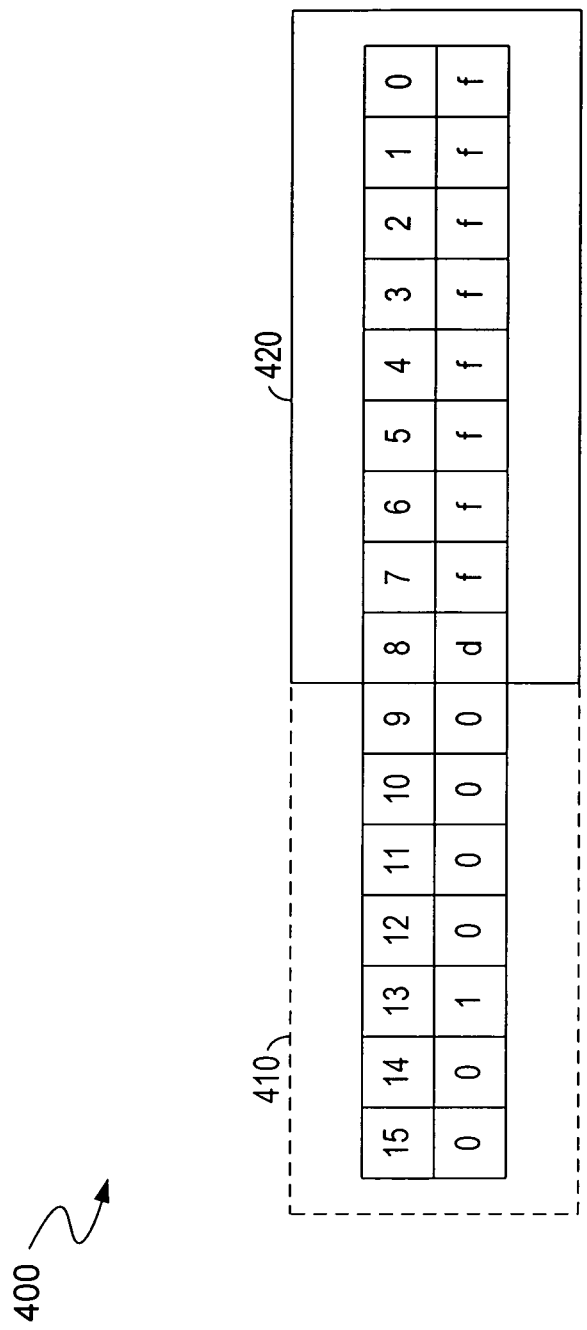
FIG. 4 illustrates an exemplary encoding of an instruction, in accordance with one embodiment of the present invention.

FIG. 4 illustrates an exemplary encoding (machine code) 400 of an instruction employed by the microcontroller 100 in FIG. 1, in accordance with one embodiment of the present invention. An instruction can be translated to a machine code, e.g., a 16-bit machine code by a translator (e.g., assembler or C-compiler). The machine code 400 includes an opcode 410 and an operand 420. The opcode 410 can indicate an operation of the instruction and have a scalable length, e.g., 7-bit, in one embodiment. The operand 420 can indicate operation data of the instruction, e.g., parameters, addresses of primary registers, addresses of secondary registers, etc. In one embodiment, the machine code 400 further includes a destination bit (e.g., bit[8]) that indicates a result destination. Advantageously, the CPU 102 can fetch primary data from primary register(s) or fetch secondary data from secondary register(s) according to the machine code 400.

The microcontroller 100 can employ multiple addressing modes including, but are not limited to, an inherent addressing mode, a literal addressing mode, a register addressing mode, a direct addressing mode, an indirect addressing mode. Inherent instructions do not require addresses other than what are explicitly defined in the instructions, in one embodiment. Literal instructions contain a literal constant field, which can be used for mathematical operations. For example, an instruction includes a parameter k, which can be an 8-bit data for direct operation.

If an instruction indicates a register addressing mode, the instruction designates one or more registers that contain data for operation. The instruction can designate one or more primary registers 302~318, or one or more secondary registers 342~348. Operations can be completed directly with the registers designated in the instruction.

Executing a direct addressing instruction needs to access the data memory at an address that is contained in the instruction, in one embodiment. The direct addressing instruction can include the operand @f, which can be an 8-bit address of a register. For a 16-bit machine code (e.g., the encoding 400 in FIG. 4), bit[7]~bit[0] can be used to access the data memory from address 0 to 255.

For an exemplary instruction ADDM A, @f, d, the operation is an addition of the data in the accumulator A (e.g., the register R0L in FIG. 2) and the data at address (f) in the data memory (e.g., the SRAM in FIG. 2) with direct addressing mode, and an addition result is written into the accumulator A or the data memory at the address (f) according to the destination bit 'd' in the instruction.

Advantageously, the direct addressing space in the data memory can be extended. The machine code 400 of an instruction can include an address for accessing a data memory, and at least one mode bit operable for selecting a mode between a normal direct addressing mode in which the data memory is accessed according to the address in the instruction and an extended direct addressing mode in which the data memory 108 is accessed according to an extended address including the address in the instruction and an extra address. The extra address can be stored in a register of the microcontroller. The extra address in the register and the address in the instruction can form an extended address. Thus, the data memory 108 can be accessed according to the extended address.

For example, bit[7]~bit[5] of the machine code 400 can be used as the mode bits. If bit[7]~bit[5] is from '000' to '110' (e.g., '000', '001', '010', '011', '100', '101', or '110'), which indicate the normal direct addressing mode, bit[7]~bit[0] can be used to access the data memory from 0 to 223, in one embodiment. If bit[7]~bit[5] is '111', the extended addressing mode can be selected. An 8-bit data in a register (e.g., the register IXH 312 in FIG. 3) and bit[4]~bit[0] of the machine code 400 can be combined together as a 13-bit address, which can directly access an 8K-byte space in the data memory, in one embodiment. Thus, the direct addressing space is expanded.

The microcontroller 100 can also execute instructions that indicate indirect addressing modes. An index register can be designated for indirect addressing, e.g., the register IX 346 or IY 348. An indirect addressing instruction further includes an offset. The offset can be added to or subtracted from the content in the index register to provide an index address. The data memory 108 can be accessed according to the index address. In one embodiment, the offset is a 5-bit immediate offset, e.g., denoted as offs5[rx] that can be added to the content in the index register. In another embodiment, the offset is a 3-bit automatic offset-post-increment (OPI). The index address is the value in the index register adding to the 3-bit offset value. In another embodiment, the offset is a 3-bit automatic offset-pre-decrement (OPD). The index address is the value in the index register subtracting the 3-bit offset value.

The indirect addressing instructions can include the operands such as q, rx, r, @offs5[rx], @offs3[rx], @offs5[IY], @offs3[IY], @offs3[IX], p, c, e, n, etc. The parameter q can represent an index mode selection bit. In one embodiment, the automatic offset-post-increment (OPI) is selected if q is equal to 0, and the automatic offset-pre-decrement (OPD) is selected if q is equal to 1. The parameter rx can indicate an index register (e.g., IX or IY), and r can represent a register selection bit. In one embodiment, the register IX is selected if r is equal to 0, and the register IY is selected if r is equal to 1.

The parameter @offs5[rx] can indicate a 5-bit offset based on the index register (e.g., IX or IY) selected by r, denoted as "ooooo" in encoding. The parameter @offs3[rx] can indicate a 3-bit offset based on the index register (e.g., IX or IY) selected by r, denoted as "ooo" in encoding. The parameter @offs5[1Y] can indicate a 5-bit offset based on the register IY, denoted as "ooooo" or "yyyyy" in encoding. The parameter @offs3[IY] can indicate a 3-bit offset based on the register IY, denoted as 'ooo' or 'yyy' in encoding. The parameter @offs3[IX] can indicate a 3-bit offset based on the register IX, denoted as 'ooo' or 'xxx' in encoding.

The parameter p can be a byte selection bit used for loading program memory data with bytes. In one embodiment, higher bytes of the program memory data are selected if p is equal to 0, and lower bytes of the program memory data are selected if p is equal to 1.

The parameter c can be a selection bit for selecting clear or set operation. In one embodiment, clear operation is selected if c is equal to 0, and set operation is selected if c is equal to 1. The parameter e can be a 3-bit data for bit position selection for an 8-bit data, denoted as "eee" in encoding. The parameter n can be an index number (8-bit) for branch, relative call, or relative jump operations.

As described hereinabove in FIG. 1, the microcontroller 100 includes an instruction memory 104 for storing an instruction set. Each of the instructions includes an opcode operable for indicating an operation of the corresponding instruction, and an operand operable for indicating operating data of the corresponding instruction.

The plurality of instructions of the instruction set can be selected from multiple instruction categories that are described hereinafter in the examples of FIGS. 5~FIG. 31. FIG. 5~FIG. 11 illustrate exemplary arithmetic operation instructions, in accordance with one embodiment of the invention. The arithmetic operation instructions include ADD instructions, e.g., addition without carry instructions (e.g., byte addition without carry, word addition without carry), ADC instructions, e.g., addition with carry instructions (e.g., byte addition with carry, word addition with carry), SUB instructions, e.g., subtraction without carry instructions (e.g., byte subtraction without carry, word subtraction without carry), SBC instructions, e.g., subtraction with carry instructions (e.g., byte subtraction with carry, word subtraction with carry), INC instructions, e.g., increment instructions (e.g., byte increment, word increment), DEC instructions, e.g., decrement instructions (e.g., byte decrement, word decrement), CMP instructions, e.g., comparison (unsigned) instructions (e.g., byte comparison, word comparison), MUL instructions, e.g., multiply (unsigned) instructions (e.g., byte multiply, word multiply), etc.

FIGS. 12~FIG. 22 illustrate exemplary logic operation instructions, in accordance with one embodiment of the invention. The logic operation instructions include logic AND instructions (e.g., byte AND, word AND), logic OR instructions (e.g., byte OR, word OR), XOR instructions, e.g., logic exclusive OR instructions (e.g., byte XOR, word XOR), RLC instructions, e.g., rotate left through carry instructions (e.g., byte version RLC, word version RLC), RRC instructions, e.g., rotate right through carry instructions (e.g., byte RRC, word RRC), RLNC instructions, e.g., rotate left without carry instructions (e.g., byte RLNC, word RLNC), RRNC instructions, e.g., rotate right without carry instructions (e.g., byte RRNC, word RRNC), SWAP instructions, e.g., swap nibbles instructions (e.g., byte SWAP, word SWAP), NOT instructions, e.g., one's complementation instructions (e.g., byte NOT, word NOT), NEG instructions, e.g., two's complementation instructions (e.g., byte NEG, word NEG), CLR instructions, e.g., data memory clear instructions (e.g., byte CLR, word CLR), SET instructions, e.g., data memory set instructions (e.g., byte SET, word SET), etc.

FIGS. 23~FIG. 26 illustrate exemplary data transfer instructions, in accordance with one embodiment of the invention. The data transfer instructions include MOVE instructions (e.g., byte MOVE, word MOVE), LPX instructions, LPD instructions, LPW instructions, PUSH instructions (e.g., byte PUSH, word PUSH), POP instructions (e.g., byte POP, word POP), etc.

FIGS. 27~FIG. 28 illustrate exemplary bit and bit test instructions, in accordance with one embodiment of the invention. The bit and bit test instructions include BSC instructions, e.g., bit clear or set in working byte-registers and data memory, BCSCC instructions, e.g., bit clear or set in conditional code register, BTG instructions, e.g., bit toggle in working byte-registers and data memory, etc.

FIGS. 29~FIG. 30 illustrate exemplary program branching instructions, in accordance with one embodiment of the invention. The program branching instructions include SKP instructions, e.g., skip if bit e in working byte-registers and data memory is cleared or set, SKPCC instructions, e.g., skip if bit e in conditional code register is cleared or set, BRACC instructions, e.g., branch if bit e in conditional code register is cleared or set, RJMP instructions, e.g., relative jump (branch unconditionally), IJMP instructions, e.g., indexed jump, RCALL instructions, e.g., relative call to subroutine, ICALL instructions, e.g., indexed call to subroutine, CTBL instructions, e.g., call table function, JTBL instructions, e.g., jump based on look-up-table, RET instructions, e.g., return from subroutine, RETD instructions, e.g., return subroutine with immediate data, RETI instructions, e.g., return from interrupt, etc.

FIG. 31 illustrates exemplary control instructions, in accordance with one embodiment of the invention. The control instructions include NOP instructions (e.g., no operation), SLEEP instructions (e.g., sleep function), WTDCLR instructions (e.g., clear watchdog timer), TRAP instructions (e.g., special software interrupt), etc.

In an application, certain instructions can be selected from the instructions listed in FIGS. 5~FIG. 31 to constitute a dedicated instruction set. Therefore, various instruction sets (e.g., S0, S1, S2, and S3 shown in FIGS. 5~FIG. 31) can be configured with selected instructions according to various application requirements. The microcontroller 100 can employ a specific instruction set with required instructions instead of employing all the instructions in various categories. Consequently, the space of the instruction memory 104 for storing the instruction set can be further reduced to decrease system complexity and cost.

Figure 32:
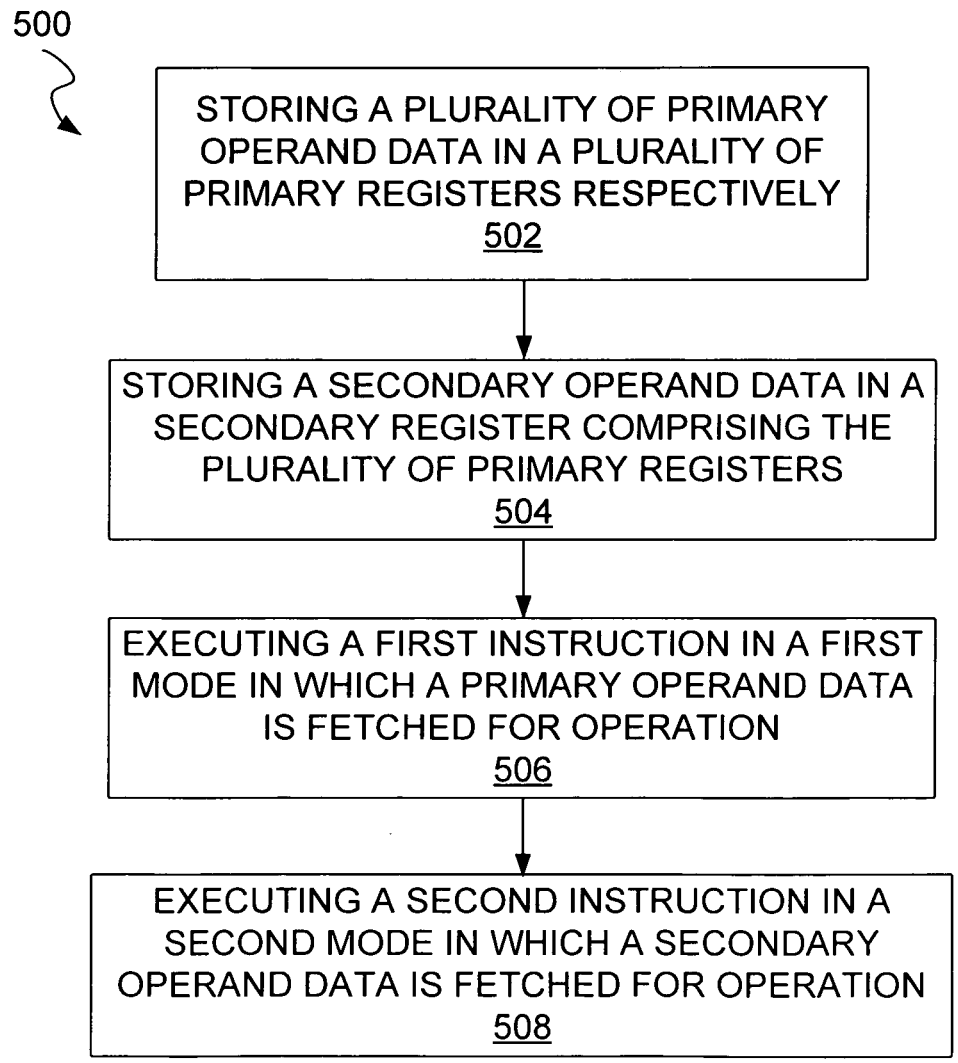
FIG. 32 illustrates a flowchart of operations performed by a microcontroller, in accordance with one embodiment of the invention.

FIG. 32 illustrates a flowchart 500 of operations performed by a microcontroller (e.g., the microcontroller 100 in FIG. 1), in accordance with one embodiment of the invention. FIG. 32 is described in combination with FIG. 1 and FIG. 3. In block 502, a plurality of primary data can be stored in a plurality of primary registers, e.g., primary registers 302 and 304, respectively. Each primary data of the plurality of primary data has a first width. In block 504, a secondary data having a second width can be stored in a secondary register including the plurality of primary registers (e.g., secondary register 342 including the primary registers 302 and 304). The secondary data includes a combination of the primary data. In block 506, the CPU 102 can execute a first instruction in a first mode in which a primary data (e.g., the data in the primary register 302 or 304) of the plurality of primary data is fetched for operation. In block 508, the CPU 102 can also execute a second instruction in a second mode in which the secondary data (e.g., the data in the secondary register 342) is fetched for operation.

Figure 33:
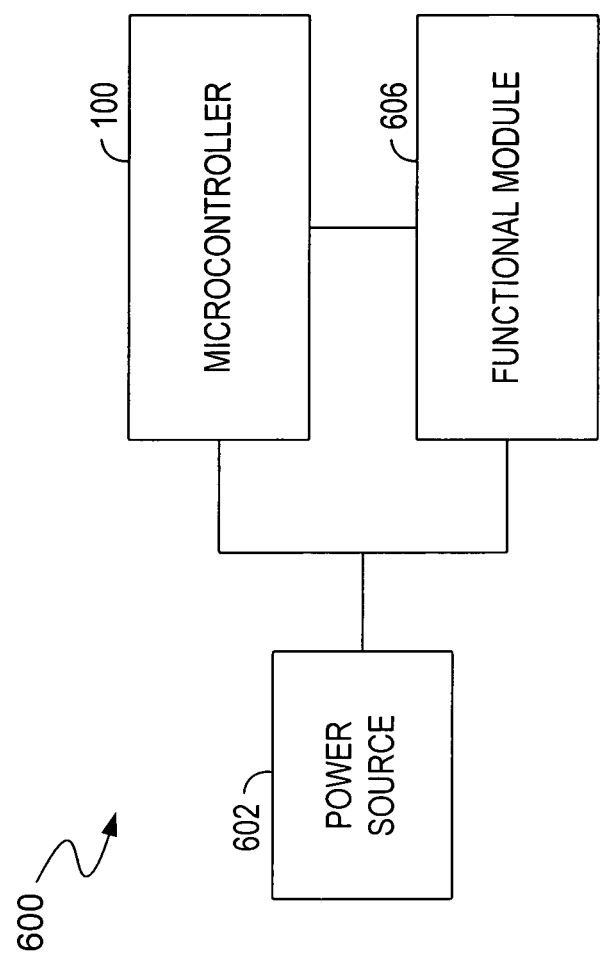
FIG. 33 illustrates a block diagram of an electronic system, in accordance with one embodiment of the invention.

FIG. 33 illustrates a block diagram of an electronic system 600 employing a microcontroller, in accordance with one embodiment of the invention. The electronic system 600 includes a power source 602, a microcontroller 100, and a function module 606 controlled by the microcontroller 100. The power source 602 supplies power to the microcontroller 100 and the function module 606, in one embodiment. The microcontroller 100 employs the architecture disclosed hereinabove in this disclosure and is operable for controlling the function module 606 according to a program including a plurality of instructions, in one embodiment. For example, the microcontroller 100 can be used in a battery management system. The microcontroller 100 can be used to control a function module, e.g., a battery charging/discharging circuit, or a cell balancing module.

Accordingly, a microcontroller 100 with a plurality of instructions is provided in the present disclosure. The microcontroller 100 has primary registers (e.g., registers of 8-bit width), and secondary registers (e.g., registers of 16-bit width) including primary registers. Instructions requiring 8-bit data or 16-bit data can be executed directly with the primary registers or the secondary registers accordingly. Certain instructions of the plurality of instructions can be selected to form a dedicated instruction set. Therefore, the instruction set is scalable and can be configured according to different application requirements. Additionally, the direct addressing space in the data memory can be extended by using an extended direct addressing mode, in which the address can be extended by an extra address in a register (e.g., the register IXH). Therefore, cost and system complexity can be reduced and efficiency can be improved in the electronic systems employing the microcontroller 100.

The embodiments that have been described herein, however, are some of the several that utilize this disclosure and are set forth here by way of illustration but not of limitation. It is obvious that many other embodiments, which will be readily apparent to those skilled in the art, may be made without departing materially from the spirit and scope of the disclosure as defined in the appended claims. Furthermore, although elements of the disclosure may be described or claimed in the singular, the plural is contemplated unless limitation to the singular is explicitly stated.

What is claimed is:

1. A microcontroller comprising:
   a plurality of primary registers operable for storing primary data, wherein each instance of said primary data has a first width;
   a secondary register comprising said at least two of said primary registers and operable for storing secondary data, wherein said secondary data has a second width, wherein said second width is an integer multiple of said first width; and
   a central processing unit (CPU) that is operable for executing a first instruction set in a first mode in which an instance of said primary data is fetched and that also is operable for executing a second instruction set in a second mode in which an instance of said secondary data is fetched; wherein said first instruction set comprises a first instruction, wherein a result of executing said first instruction is written to one of said primary registers constituting said secondary register; and wherein said second instruction set comprises a second instruction, wherein a result of executing said second instruction is written to more than one of said primary registers constituting said secondary register.

2. The microcontroller of claim 1, further comprising:
a memory for storing said first instruction and said second instruction, wherein said first instruction designates a primary register of said plurality of primary registers according to information contained in said first instruction and wherein said second instruction designates said secondary register according to information contained in said second instruction.

3. The microcontroller of claim 1, wherein said first instruction comprises an opcode.

4. The microcontroller of claim 1, wherein said secondary instruction comprises an opcode.

5. The microcontroller of claim 1, further comprising:
a translator for translating said first instruction to a first machine code and for translating said second instruction to a second machine code,
wherein said CPU fetches said instance of primary data for operation according to said first machine code and fetches said secondary data for operation according to said second machine code.

6. The microcontroller of claim 1, further comprising:
a memory for storing a direct addressing instruction, wherein a machine code translated from said direct addressing instruction comprises:
a primary address for designating a data memory; and
a least one mode bit operable for selecting a mode between a normal direct addressing mode in which said data memory is accessed to said address and an extended direct addressing mode in which said data memory is accessed according to an extended address comprising said address and an extra address.

7. The microcontroller of claim 6, wherein said extra address is stored in a register of said microcontroller.

8. A method comprising:
storing a plurality of instances of primary data in a plurality of primary registers respectively, wherein each instance of said primary data has a first width;
storing secondary data having a second width in a secondary register comprising at least two of said primary registers, wherein said second width is an integer multiple of said first width;
executing a first instruction in a first mode in which an instance of said primary data is fetched; and
executing a second instruction in a second mode in which said secondary data is fetched; wherein a result of executing said first instruction is written to a single one of said primary registers that constitute said secondary register, and wherein a result of executing said second instruction is written to more than one of said primary registers that constitute said secondary register.

9. The method of claim 8, further comprising:
designating a primary register of said primary registers according to information contained in said first instruction; and
designating said secondary register according to information contained in said second instruction.

10. The method of claim 8, further comprising:
translating said first instruction to a first machine code;
fetching said instance of said primary data for operation according to said first machine code;
translating said second instruction to a second machine code; and
fetching said secondary data for operation according to said second machine code.

11. An electronic system comprising:
a functional module; and
a microcontroller operable for controlling said functional module according to a program comprising a first instruction and a second instruction, said microcontroller comprising:
a plurality of primary registers operable for storing primary data, wherein each instance of said primary data has a first width;
a secondary register comprising said at least two of said primary registers and operable for storing secondary data, wherein said secondary data has a second width, wherein said second width is an integer multiple of said first width; and
a central processing unit (CPU) that is operable for executing a first instruction set in a first mode in which an instance of said primary data is fetched and that also is operable for executing a second instruction set in a second mode in which an instance of said secondary data is fetched; wherein said first instruction set comprises a first instruction, wherein a result of executing said first instruction is written to a single one of said primary registers that constitute said secondary register; and wherein said second instruction set comprises a second instruction, wherein a result of executing said second instruction is written to said more than one of said primary registers that constitute secondary register.

12. The electronic system of claim 11, wherein said microcontroller further comprises a memory for storing said first instruction and said second instruction, wherein said first instruction designates a primary register of said primary registers according to information contained in said first instruction and wherein said second instruction designates said secondary register according to information contained in said second instruction.

13. The electronic system of claim 11, wherein said first instruction comprises an opcode.

14. The electronic system of claim 11, wherein said secondary instruction comprises an opcode.

15. The electronic system of claim 11, wherein said microcontroller further comprises:
a translator for translating said first instruction to a first machine code and for translating said second instruction to a second machine code,
wherein said CPU fetches said instance of primary data for operation according to said first machine code and fetches said secondary data for operation according to said second machine code.

16. The electronic system of claim 11, further comprising:
a memory for storing a direct addressing instruction, wherein a machine code translated from said direct addressing instruction comprises:
a primary address for designating a data memory; and
a least one mode bit operable for selecting a mode between a normal direct addressing mode in which said data memory is accessed to said address and an extended direct addressing mode in which said data memory is accessed according to an extended address comprising said address and an extra address.

17. The electronic system of claim 16, wherein said extra address is stored in a register of said microcontroller.

* * * * *